J. R. WILLIAMS.
FERRULE FOR PIPES.
APPLICATION FILED APR. 25, 1908.
909,725.
Patented Jan. 12, 1909.
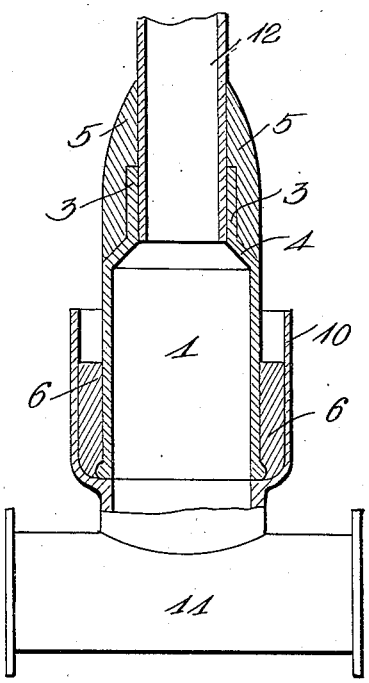
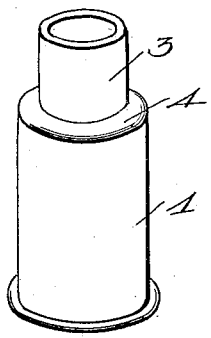
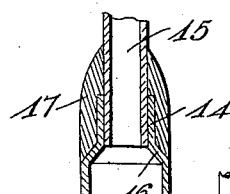
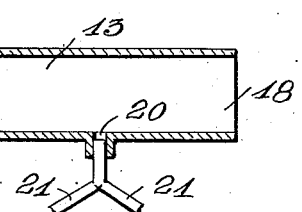
Witnesses
Inventor
J. R. Williams
By H. B. Willson & Co.
Attorneys

UNITED STATES PATENT OFFICE.

JOHN R. WILLIAMS, OF MILWAUKEE, WISCONSIN.

FERRULE FOR PIPES.

No. 909,725.   Specification of Letters Patent.   Patented Jan. 12, 1909.

Application filed April 25, 1908. Serial No. 429,264.

*To all whom it may concern:*

Be it known that I, JOHN R. WILLIAMS, a citizen of the United States, residing at Milwaukee, in the county of Milwaukee and State of Wisconsin, have invented certain new and useful Improvements in Ferrules for Pipes; and I do declare the following to be a full, clear, and exact description of the invention, such as will enable others skilled in the art to which it appertains to make and use the same.

This invention relates to an improved ferrule for connecting the lead waste pipe of sinks, closets and the like with the iron sewer pipe fitting.

The object of the invention is to provide a ferrule which strengthens the joint at the connection of the lead pipe therewith and produces an easy joint, and one which the waste passing through the lead pipe will not come in contact with the solder used for sealing the joint.

Another object is to provide a ferrule which will offer a smooth unobstructed surface to the passage of the sewage and thereby avoid the collection of grease and other waste matter therein.

With these and other objects in view, the invention consists of certain novel features of construction, combination and arrangement of parts, as will be more fully described and particularly pointed out in the appended claim.

In the accompanying drawings, Figure 1 is a vertical section of this improved ferrule applied, Fig. 2 is a perspective view of the ferrule detached, Fig. 3 is a side elevation partly in vertical section of a slightly modified form of the invention.

In the embodiment illustrated, in Figs. 1 and 2, a ferrule 1, is shown composed of any suitable material preferably of brass and of any desired weight and size to conform to the plumbing regulations of different cities. This ferrule comprises a tubular body member having an out-turned lower edge 2, to fit smoothly in the fitting 10, of the iron pipe 11. The upper end of this ferrule is made similar to that of a bottle neck and shoulder, the neck 3 being of a sufficient length and of a size slightly larger than the lead pipe 12, to receive and support said pipe 12, preferably overlapping it for about three-fourths of an inch, more or less thereby reinforcing and strengthening the joint and at the same time making an easy joint and one which would resist any action of acids which might affect the solder as the waste matter is prevented by this joint from coming in contact with the solder. The shoulder 4 is designed to support a solder joint 5, which extends flush with the outer face of the cylindrical body member of the ferrule and leaves an unobstructed space for the insertion of the calking tool within the fitting 10, said fitting 10 being spaced from the body of the ferrule 1 to receive oakum as 6, which is calked into the fitting to connect the curved end 2, of the ferrule therewith.

In the form illustrated in Fig. 3, a bent ferrule 13 is shown having its upper end 14 constructed and connected with the lead pipe 15 in the same manner as that shown in the other figures with the reduced neck fitting closely around the lead pipe and having an exterior shoulder 16 to support the solder joint 17. The end 18 of this bent ferrule is adapted for connection with the sewer (not shown) in any suitable manner. This ferrule is also preferably provided in one arm with vent openings as 19 arranged on opposite sides of the ferrule and the other arm is provided with waste openings as 20 having ells as 21 designed to connect the waste pipes at any desired angle. From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

I claim as my invention:

In a pipe joint for plumbing, the combination with a fitting and a lead pipe, of a ferrule having one end disposed within said fitting and spaced from the walls thereof, said ferrule having its other end reduced with a shoulder formed between said reduced end or neck and the body portion, said neck tightly fitting and overlapping said lead pipe to form a reinforced tight joint, a solder joint encircling said neck and said lead pipe and resting on said shoulder with the outer face of said joint extending approximately flush with the outer face of the body of said ferrule, and a suitable calking material disposed in said fitting and around the end of the ferrule disposed therein.

In testimony whereof I have hereunto set my hand in presence of two subscribing witnesses.

JOHN R. WILLIAMS.

Witnesses:
 FRANK SCHWINN,
 W. E. GITTINS.